United States Patent
Ho et al.

(10) Patent No.: US 9,531,213 B2
(45) Date of Patent: Dec. 27, 2016

(54) WIRELESS POWER TRANSMISSION DEVICE

(71) Applicant: Primax Electronics Ltd., Neihu, Taipei (TW)

(72) Inventors: Yung-Hsien Ho, Taipei (TW); Hung-Wei Chiu, Taipei (TW); Chun-Hao Lo, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 146 days.

(21) Appl. No.: 14/549,001

(22) Filed: Nov. 20, 2014

(65) Prior Publication Data

US 2016/0099576 A1    Apr. 7, 2016

(30) Foreign Application Priority Data

Oct. 3, 2014   (TW) ............................. 103134628 A

(51) Int. Cl.
*H02J 7/02* (2016.01)
(52) U.S. Cl.
CPC ............... *H02J 7/025* (2013.01); *H02J 50/10* (2016.02); *H02J 50/80* (2016.02)
(58) Field of Classification Search
CPC ................................. H02J 5/005; H02J 7/025
USPC ........................................................ 320/108
See application file for complete search history.

(56) References Cited

U.S. PATENT DOCUMENTS

| | | | | |
|---|---|---|---|---|
| 2014/0361739 | A1* | 12/2014 | Kwak | H02J 5/005 320/108 |
| 2014/0375258 | A1* | 12/2014 | Arkhipenkov | H02J 7/025 320/108 |

* cited by examiner

*Primary Examiner* — Drew A Dunn
*Assistant Examiner* — Sailesh Thapa
(74) *Attorney, Agent, or Firm* — Kirton McConkie; Evan R. Witt

(57) ABSTRACT

A wireless power transmission device includes a main body, a first transmitter coil and a second transmitter coil. The second transmitter coil is partially stacked over the first transmitter coil. If the wireless power transmission device is operated in a detecting mode, a magnetic flux oriented in the direction toward the top surface of the main body is generated by the first transmitter coil. The magnetic flux is attenuated by the second transmitter coil. Consequently, the electromagnetic wave is inhibited. If the wireless power transmission device detects that an electronic device is located near the first transmitter coil, the first transmitter coil is controlled to be in a charging mode to transmit the magnetic flux to the electronic device, and the magnetic flux is no longer attenuated by the second transmitter coil.

8 Claims, 5 Drawing Sheets

WIRELESS POWER TRANSMISSION DEVICE

FIELD OF THE INVENTION

The present invention relates to a power transmission device, and more particularly to a wireless power transmission device utilizing a wireless charging technology.

BACKGROUND OF THE INVENTION

Conventionally, most electronic devices should be connected with power sources to acquire electric power in order to be normally operated. Generally, all of these electronic devices may be plugged into corresponding power sources (for example power sockets) to acquire the electric power through power cables. With increasing development of science and technology, a variety of electronic devices are developed toward small size, light weightiness and easy portability in order to comply with the users' requirements. Although the electronic device can be easily carried, the electronic device cannot be connected with the power source to acquire the electric power through the power cable at any time. Generally, a built-in chargeable battery is usually installed in the electronic device for providing sufficient electric power to the electronic device.

For example, in case that the electricity quantity of the chargeable battery of the electronic device is insufficient, the chargeable battery of the electronic device may be charged by a charging device. In this context, the charging device is also referred as a power transmission device. Generally, the conventional power transmission device has a connecting wire. After the connecting wire is plugged into the electronic device and the conventional power transmission device is connected with the power source, the electric power may be transmitted from the power transmission device to the electronic device through the connecting wire. However, the applications of the power transmission device during the charging process are usually restricted by the connecting wire. For example, since the length of the connecting wire of the power transmission device is limited, the electronic device cannot be operated according to the usual practice or the electronic device cannot be arbitrarily moved. On the other hand, if the conventional power transmission device has been repeatedly used to charge the electronic device for a long term, the connector of the connecting wire of the power transmission device is readily damaged because the connector of the connecting wire is frequently plugged into and removed from the electronic device. Under this circumstance, the charging efficiency of the connecting wire of the power transmission device is deteriorated. If the connector is seriously damaged, the charging task fails to be done through the connecting wire.

With increasing development of a wireless charging technology, a wireless power transmission device for wirelessly charging the electronic device has been introduced into a market in order to solve the drawbacks of using the connecting wire by the wired charging technology. FIG. 1 schematically illustrates the relationship between a conventional wireless power transmission device and a conventional electronic device. As shown in FIG. 1, the conventional wireless power transmission device 1 comprises a main body 10, a power cable 11, a driving circuit 12, and a transmitter coil 13. In addition, the conventional electronic device 2 comprises a casing 20, a receiver coil 21, and a chargeable battery (not shown).

In the conventional wireless power transmission device 1, the power cable 11 is exposed outside the main body 10 in order to be connected with a power source (not shown). Both of the driving circuit 12 and the transmitter coil 13 are disposed within the casing 10. Moreover, the driving circuit 12 is connected with the power cable 11 and the transmitter coil 13. When the driving circuit 12 is driven by the power source, a voltage is provided to the driving circuit 12 and thus an electric current is generated by the driving circuit 12. When the electric current flows through the transmitter coil 13, an electromagnetic effect is generated. According to the electromagnetic effect, a magnetic flux is generated by the transmitter coil 13. In the conventional electronic device 2, the receiver coil 21 is disposed within the casing 20 for receiving the magnetic flux from the transmitter coil 13, so that the magnetic flux is converted into an electric power. The chargeable battery is connected with the receiver coil 21 for storing and utilizing the electric power which is received by the receiver coil 21.

For achieving a power-saving purpose, the conventional wireless power transmission device 1 may be selectively operated in a charging mode or a detecting mode. When the conventional wireless power transmission device 1 is operated in the charging mode, the above charging process is performed and not redundantly described herein. When the conventional wireless power transmission device 1 is operated in the detecting mode, the conventional wireless power transmission device 1 is electrically conducted to periodically generate the electromagnetic effect at a predetermined time interval (e.g. 100 ms) according to predetermined settings. Moreover, in the detecting mode, the conventional wireless power transmission device 1 judges whether the conventional electronic device 2 to be charged is placed on the main body 10 by detecting whether a communication signal is transmitted from the receiver coil 21 of the conventional electronic device 2. If the conventional wireless power transmission device 1 judges that the conventional electronic device 2 to be charged is placed on the main body 10, the operating mode of the conventional wireless power transmission device 1 is switched from the detecting mode to the charging mode. Under this circumstance, the conventional wireless power transmission device 1 charges the conventional electronic device 2 without the need of saving the electric power.

However, if the conventional wireless power transmission device 1 is operated in the detecting mode and the conventional electronic device 2 is not placed on the main body 10, some drawbacks may occur. Since no object is placed on the main body 10 to absorb the magnetic flux which is generated by the electromagnetic effect and the generated energy in a short time period is very large, the electromagnetic wave is scatted everywhere by radiation. As known, the scattered electromagnetic wave not only influences the electronic device but also hurts the user's body.

Therefore, there is a need of providing a wireless power transmission device for avoiding the generation of the scattered electromagnetic wave.

SUMMARY OF THE INVENTION

The present invention provides a wireless power transmission device for avoiding the generation of the scattered electromagnetic wave.

In accordance with an aspect of the present invention, there is provided a wireless power transmission device for wirelessly charging an electronic device. The wireless power transmission device includes a main body, a driving circuit, a first transmitter coil and a second transmitter coil. The driving circuit is disposed within the main body, and provides a first voltage or a second voltage. The first transmitter coil is disposed within the main body and located near a first lateral side of the main body. The second transmitter coil is disposed within the main body, located away from the first lateral side of the main body, and partially stacked over the first transmitter coil.

If the electronic device is not placed on the main body and the first transmitter coil is in a detecting mode, the driving circuit periodically provides the first voltage to the first transmitter coil at a first predetermined time interval. A first magnetic flux is generated by the first transmitter coil according to the first voltage and the first magnetic flux is attenuated by the second transmitter coil, so that the attenuated first magnetic flux is periodically outputted from the wireless power transmission device at the first predetermined time interval.

If the electronic device is not placed on the main body and the second transmitter coil is in a detecting mode, the driving circuit periodically provides the first voltage to the second transmitter coil at the first predetermined time interval. A second magnetic flux is generated by the second transmitter coil according to the first voltage and the second magnetic flux is attenuated by the first transmitter coil, so that the attenuated second magnetic flux is periodically outputted from the wireless power transmission device at the first predetermined time interval.

If the electronic device is placed on the main body and located near the first transmitter coil, the driving circuit provide a third voltage to the first transmitter coil, so that the first transmitter coil is in a charging mode and the first transmitter coil generates a fourth magnetic flux to a receiver coil of the electronic device If the electronic device is placed on the main body and located near the second transmitter coil, the driving circuit provides the third voltage to the second transmitter coil, so that the second transmitter coil is in the charging mode and the second transmitter coil generates a fifth magnetic flux to the receiver coil.

From the above descriptions, the wireless power transmission device of the present invention at least comprises the first transmitter coil and the second transmitter coil. The second transmitter coil is partially stacked over the first transmitter coil. In case that the first transmitter coil is in the detecting mode, the first transmitter coil transmits a magnetic flux to the top surface of the main body, and the second transmitter coil generates an inverse magnetic flux. Since the direction of the inverse magnetic flux is opposite to the direction of the magnetic flux, the magnetic flux is attenuated and the energy of the electromagnetic wave is reduced. Consequently, the influence of the electromagnetic wave on the health of the human body will be minimized. In case that the second transmitter coil is in the detecting mode, the operations are similar to the first transmitter coil. In case that the wireless power transmission device is operated in the charging mode, the first transmitter coil or the second transmitter coil is controlled to transmit the magnetic flux. Since the magnetic flux is generated at the position near the electronic device, the power-saving purpose is achievable.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For solving the drawbacks of the conventional technologies, the present invention provides a wireless power transmission device.

Figure 1:
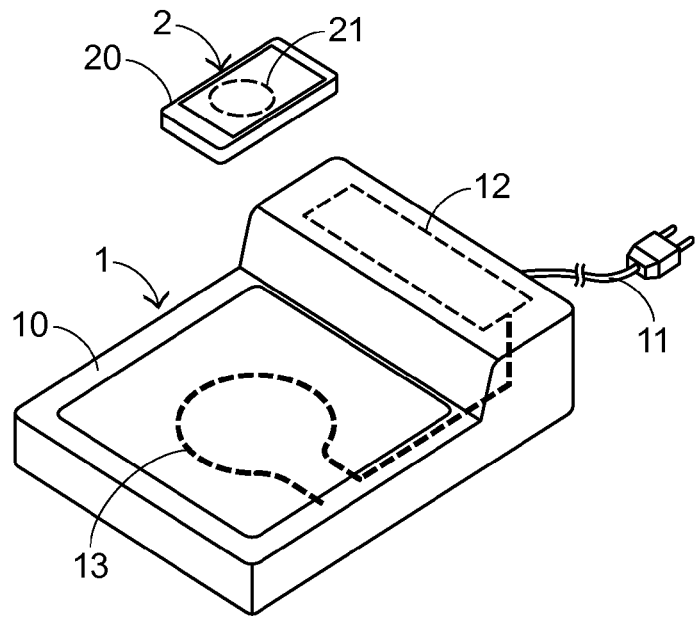
FIG. 1 schematically illustrates the relationship between a conventional wireless power transmission device and a conventional electronic device.
Figure 2:
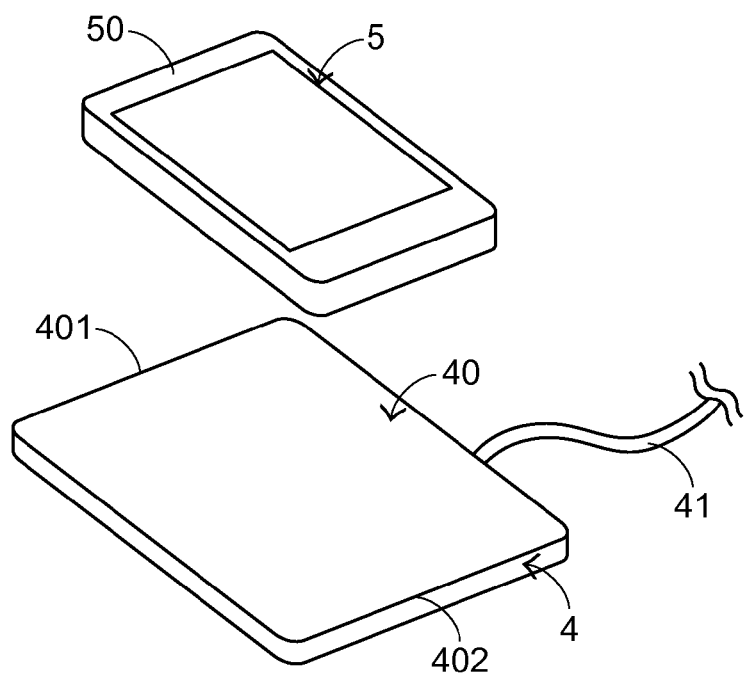
FIG. 2 schematically illustrates the relationship between an electronic device and a wireless power transmission device according to an embodiment of the present invention.
Figure 3:
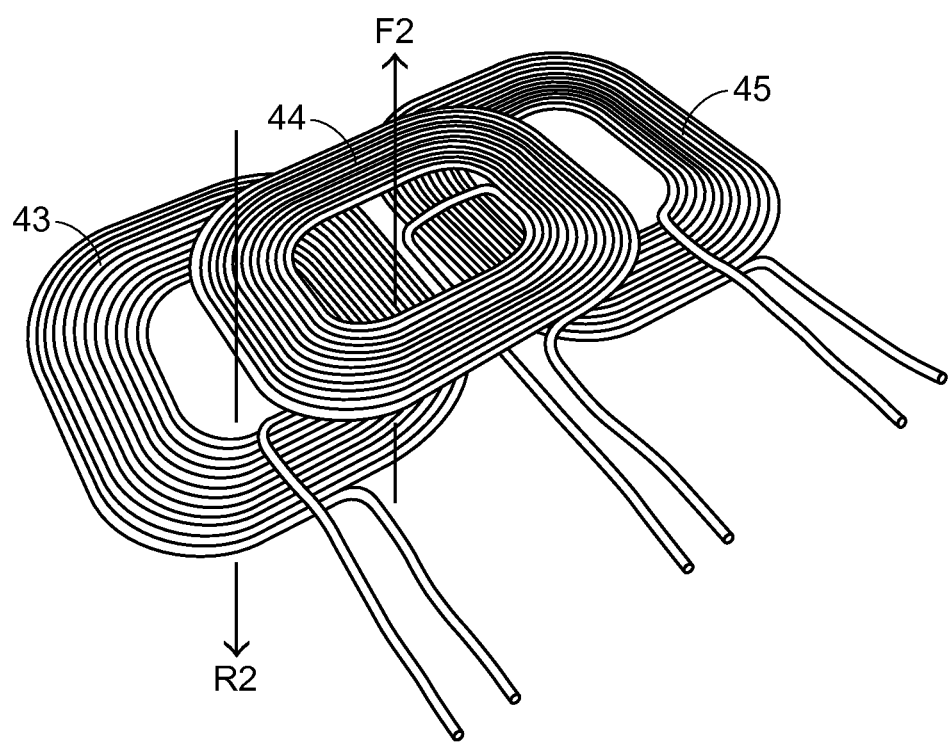
FIG. 3 schematically illustrates a first transmitter coil, a second transmitter coil and a third transmitter coil of the wireless power transmission device according to the embodiment of the present invention.
Figure 4:
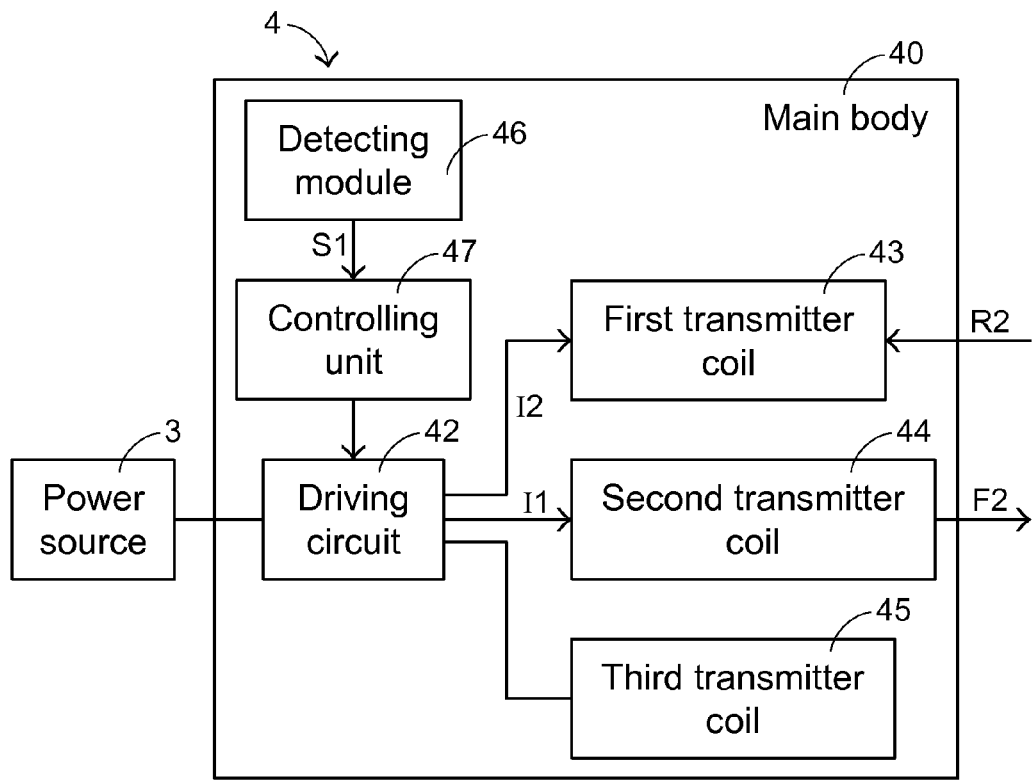
FIG. 4 is a schematic functional block diagram of the wireless power transmission device in a detecting mode according to the embodiment of the present invention.

Please refer to FIGS. 2, 3 and 4. FIG. 2 schematically illustrates the relationship between an electronic device and a wireless power transmission device according to an embodiment of the present invention. FIG. 3 schematically illustrates a first transmitter coil, a second transmitter coil and a third transmitter coil of the wireless power transmission device according to the embodiment of the present invention. FIG. 4 is a schematic functional block diagram of the wireless power transmission device in a detecting mode according to the embodiment of the present invention. In FIG. 2, the wireless power transmission device 4 and the electronic device 5 are shown. Moreover, the wireless power transmission device 4 comprises a main body 40, a power cable 41, a driving circuit 42, a first transmitter coil 43, a second transmitter coil 44, a third transmitter coil 45, a detecting module 46 and a controlling unit 47. The power cable 41 of the wireless power transmission device 4 is exposed outside the main body 40. The power cable 41 is connected with a power source 3 for acquiring an electric power from the power source 3. The driving circuit 42 is disposed within the main body 40 for providing different voltages. The first transmitter coil 43 is disposed within the main body 40 and located near a first lateral side 401 of the main body 40. The first transmitter coil 43 is connected with the driving circuit 42. According to the voltage provided by the driving circuit 42, an electromagnetic effect is generated. According to the electromagnetic effect, the corresponding magnetic flux is generated by the first transmitter coil 43. According to the practical requirements, the magnetic flux generated by the first transmitter coil 43 has a corresponding function. In this embodiment, the main body 40 of the wireless power transmission device 4 is designed to have a platform profile.

As shown in FIG. 3, the second transmitter coil 44 is disposed within the main body 40 and located away from the first lateral side 401 of the main body 40. The second transmitter coil 44 is partially stacked over the first transmitter coil 43. Moreover, the second transmitter coil 44 is connected with the driving circuit 42. According to the voltage provided by the driving circuit 42, an electromagnetic effect is generated. According to the electromagnetic effect, the corresponding magnetic flux is generated by the second transmitter coil 44. Similarly, the magnetic flux generated by the second transmitter coil 44 has a corresponding function according to the practical requirements. The third transmitter coil 45 is disposed within the main body 40 and located near a second lateral side 402 of the main body 40. The second transmitter coil 44 is partially stacked over the third transmitter coil 45. Moreover, the third transmitter coil 45 is also connected with the driving circuit 42. According to the voltage provided by the driving circuit 42, an electromagnetic effect is generated. According to the electromagnetic effect, the corresponding magnetic flux is generated by the third transmitter coil 45. Similarly, the magnetic flux generated by the third transmitter coil 45 has a corresponding function according to the practical requirements.

In this embodiment, the first transmitter coil 43, the second transmitter coil 44 and the third transmitter coil 45 are wound to have the same shape. For example, all of the first transmitter coil 43, the second transmitter coil 44 and the third transmitter coil 45 are wound to have a rectangular shape. Alternatively, in another embodiment, the first transmitter coil, the second transmitter coil and the third transmitter coil are wound to have different shapes. For example, the first transmitter coil, the second transmitter coil and the third transmitter coil are wound to have a circular shape, a rectangular shape and an elliptic shape, respectively.

Please refer to FIGS. 2, 3 and 4 again. The detecting module 46 is disposed within the main body 40 for detecting whether the electronic device 5 is placed on the main body 40. Moreover, the detecting module 46 may detect whether the electronic device 5 is located near the first transmitter coil 43, near the second transmitter coil 44 or near the third transmitter coil 45. The controlling unit 47 is connected with the detecting module 46 and the driving circuit 42. According to the signal outputted from the detecting module 46, the operations of the driving circuit 42 are controlled by the controlling unit 47. In this embodiment, the detecting module 46 is a decoder, and the controlling unit 47 is a microprocessor.

Figure 6:
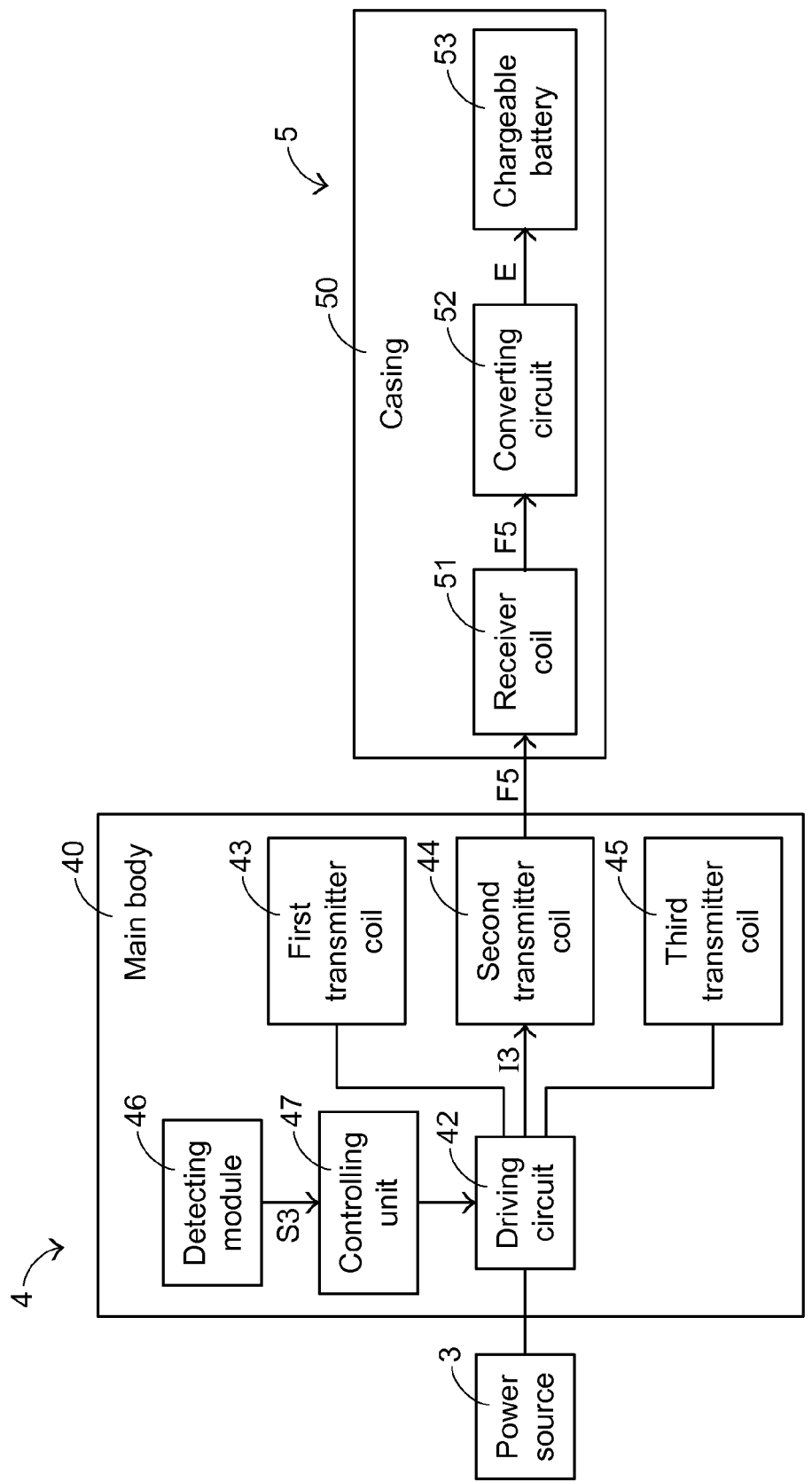
FIG. 6 is a schematic functional block diagram illustrating the wireless power transmission device and the electronic device in a charging mode according to the embodiment of the present invention.

Moreover, the electronic device 5 comprises a casing 50, a receiver coil 51, a converting circuit 52 and a chargeable battery 53 (see FIG. 6). The receiver coil 51 is covered by the casing 50. When the casing 50 is placed on the main body 40 of the wireless power transmission device 4, the receiver coil 51 may receive the magnetic flux which is generated by the first transmitter coil 43, the second transmitter coil 44 or the third transmitter coil 45 and issue a communication signal. The communication signal contains a wireless communication protocol information. The converting circuit 52 is disposed within the casing 50, and connected with the receiver coil 51 and the chargeable battery 53. The converting circuit 52 is used for converting the corresponding magnetic flux into an electric power E. The chargeable battery 53 is disposed within the casing 50, and connected with the receiver coil 51. The electric power E from the converting circuit 52 may be stored in the chargeable battery 53. In this embodiment, the electronic device 5 is a mobile phone, and the receiver coil 51 is wound to have a circular shape (not shown). Alternatively, in another embodiment, the receiver coil may be wound to have an elliptic shape or any other appropriate shape.

Figure 5:
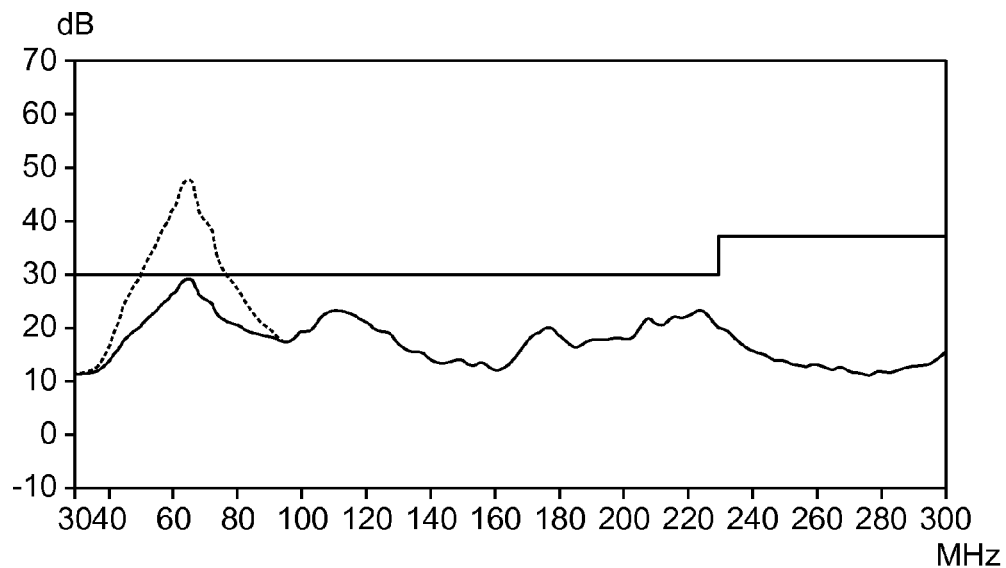
FIG. 5 is a plot illustrating the relationship between the magnetic flux and the frequency of the wireless power transmission device in the detecting mode according to the embodiment of the present invention.

Hereinafter, the operations of the wireless power transmission device 4 will be illustrated with reference to FIGS. 2, 3, 4 and 5. FIG. 5 is a plot illustrating the relationship between the magnetic flux and the frequency of the wireless power transmission device in the detecting mode according to the embodiment of the present invention. When the user intends to wirelessly charge the electronic device 5, the power cable 41 of the wireless power transmission device 4 is firstly connected with the power source 3, so that the wireless power transmission device 4 is enabled. According to the predetermined settings, the wireless power transmission device 4 is operated in the detecting mode after the wireless power transmission device 4 is enabled. In the detecting mode, the detecting module 46 issues a first switching signal S1 to the controlling unit 47. According to the first switching signal S1, the controlling unit 47 controls the driving circuit 42 to provide a first voltage to the first transmitter coil 43 within a first predetermined time segment. For example, the first predetermined time segment is the time period between the first second and the tenth second after the power transmission device 4 is enabled. Moreover, the driving circuit 42 periodically provides the first voltage to the first transmitter coil 43 at a first predetermined time interval (e.g. 500 ms), and thus a first current I1 is generated. When the first current I1 flows through the first transmitter coil 43, an electromagnetic effect is generated. According to the electromagnetic effect, a first magnetic flux is generated by the first transmitter coil 43. The first magnetic flux is oriented in a direction toward a top surface of the main body 40 where the electronic device 5 is placed.

While the first voltage is provided to the first transmitter coil 43, the controlling unit 47 also controls the driving circuit 42 to provide a second voltage to the second transmitter coil 44. According to the second voltage, a second current I2 is generated. When the second current I2 flows through the second transmitter coil 44, an electromagnetic effect is generated. According to the electromagnetic effect, a first reverse magnetic flux is generated by the second transmitter coil 44. Since second voltage and the first voltage are out of phase, the direction of the second current I2 is opposite to the direction of the first current I1 and the direction of the first reverse magnetic flux is opposite to the direction of the first magnetic flux. Moreover, since the magnitude of the second voltage is lower than the magnitude of the first voltage, the intensity of the first reverse magnetic flux is lower than the intensity of the first magnetic flux. Under this circumstance, the energy of the first magnetic flux is attenuated. Consequently, as shown in FIG. 5, the attenuated first magnetic flux is periodically outputted from power transmission device 4 at the first predetermined time interval within the first predetermined time segment. Moreover, the third transmitter coil 45 is disabled.

If no communication signal from the receiver coil 51 of the electronic device 5 is received by the detecting module 46 after the first predetermined time segment, the detecting module 46 continuously issues the first switching signal S1 to the controlling unit 47. According to the first switching signal S1, the controlling unit 47 controls the driving circuit 42 to provide the first voltage to the second transmitter coil 44 within a second predetermined time segment. For example, the second predetermined time segment is the time period between the eleventh second and the twentieth second after the power transmission device 4 is enabled. Meanwhile, the second transmitter coil 44 is in the detecting mode. Moreover, the driving circuit 42 periodically provides the first voltage to the second transmitter coil 44 at the first predetermined time interval, and thus the first current I1 is generated. When the first current I1 flows through the second transmitter coil 44, an electromagnetic effect is generated. According to the electromagnetic effect, a second magnetic flux F2 is generated by the second transmitter coil 44. The second magnetic flux F2 is oriented in a direction toward the top surface of the main body 40 where the electronic device 5 is placed.

While the first voltage is provided to the second transmitter coil 44, the controlling unit 47 also controls the driving circuit 42 to provide the second voltage to the first transmitter coil 43. According to the second voltage, a second current I2 is generated. When the second current I2 flows through the first transmitter coil 43, an electromagnetic effect is generated. According to the electromagnetic effect, a second reverse magnetic flux R2 is generated by the first transmitter coil 43. The direction of the second reverse magnetic flux R2 is opposite to the direction of the second magnetic flux F2. Moreover, since the magnitude of the second voltage is lower than the magnitude of the first voltage, the intensity of the second reverse magnetic flux R2 is lower than the intensity of the second magnetic flux F2. Under this circumstance, the energy of the second magnetic flux F2 is attenuated. Consequently, as shown in FIG. 5, the attenuated second magnetic flux is periodically outputted from power transmission device 4 at the first predetermined time interval within the second predetermined time segment. Moreover, the third transmitter coil 45 is disabled. In FIG. 5, the magnetic flux indicated by dotted line is the second magnetic flux F2 which is not attenuated by the first transmitter coil 43. The intensity of the second magnetic flux F2 is higher than the intensity of the attenuated second magnetic flux F2.

If no communication signal from the receiver coil 51 of the electronic device 5 is received by the detecting module 46 after the second predetermined time segment, the detecting module 46 continuously issues the first switching signal S1 to the controlling unit 47. According to the first switching signal S1, the controlling unit 47 controls the driving circuit 42 to provide the first voltage to the third transmitter coil 45 within a third predetermined time segment. For example, the third predetermined time segment is the time period between the twenty-first second and the thirtieth second after the power transmission device 4 is enabled. Meanwhile, the third transmitter coil 45 is in the detecting mode. Moreover, the driving circuit 42 periodically provides the first voltage to the third transmitter coil 45 at the first predetermined time interval, and thus the first current I1 is generated. When the first current I1 flows through the third transmitter coil 45, an electromagnetic effect is generated. According to the electromagnetic effect, a third magnetic flux is generated by the third transmitter coil 45. The third magnetic flux is oriented in a direction toward the top surface of the main body 40 where the electronic device 5 is placed.

While the first voltage is provided to the third transmitter coil 45, the controlling unit 47 also controls the driving circuit 42 to provide a second voltage to the second transmitter coil 44. According to the second voltage, the second current I2 is generated. When the second current I2 flows through the second transmitter coil 44, an electromagnetic effect is generated. According to the electromagnetic effect, a third reverse magnetic flux is generated by the second transmitter coil 44. The direction of the third reverse magnetic flux is opposite to the direction of the third magnetic flux. Moreover, since the magnitude of the second voltage is lower than the magnitude of the first voltage, the intensity of the third reverse magnetic flux is lower than the intensity of the third magnetic flux. Under this circumstance, the energy of the third magnetic flux is attenuated. Consequently, the attenuated third magnetic flux is periodically outputted from power transmission device 4 at the first predetermined time interval within the third predetermined time segment. Moreover, the third transmitter coil 45 is disabled.

At this moment, the electronic device 5 is still not placed on the main body 40, and thus no communication signal from the receiver coil 51 is received by the detecting module 46. Then, the detecting module 46 may wait for a second predetermined time interval (e.g. 3 minutes) to receive the communication signal. If the communication signal is still not received by the detecting module 46 within the second predetermined time interval, the wireless power transmission device 4 is operated in a sleep mode by the controlling unit 47.

In this embodiment, the first predetermined time segment, the second predetermined time segment and the third predetermined time segment are collaboratively defined as a detecting time period (e.g. 30 seconds). If no communication signal from the receiver coil 51 is received by the detecting module 46 after the first predetermined time segment, the second predetermined time segment and the third predetermined time segment, the first transmitter coil 43 is in the detecting mode again under control of the controlling unit 47. In addition, the attenuated magnetic flux is periodically outputted from power transmission device 4 at the first predetermined time interval until the wireless power transmission device 4 is operated in the sleep mode.

Please refer to FIGS. 2, 3, 4 and 6. FIG. 6 is a schematic functional block diagram illustrating the wireless power transmission device and the electronic device in a charging mode according to the embodiment of the present invention. In case that the electronic device 5 is placed on the top surface of the main body 40 and the electronic device 5 is located near the first transmitter coil 43, the attenuated first magnetic flux is received by the receiver coil 51 of the electronic device 5. Consequently, a first communication signal corresponding to the first transmitter coil 43 is transmitted from the receiver coil 51 to the first transmitter coil 43. After the first communication signal is received by the detecting module 46, the detecting module 46 issues a second switching signal (not shown) to the controlling unit 47. According to the second switching signal, the controlling unit 47 controls the driving circuit 42 to provide a third voltage to the first transmitter coil 43. Meanwhile, the first transmitter coil 43 is in the charging mode. Moreover, the magnitude of the third voltage is lower than the magnitude of the first voltage.

Figure 7:
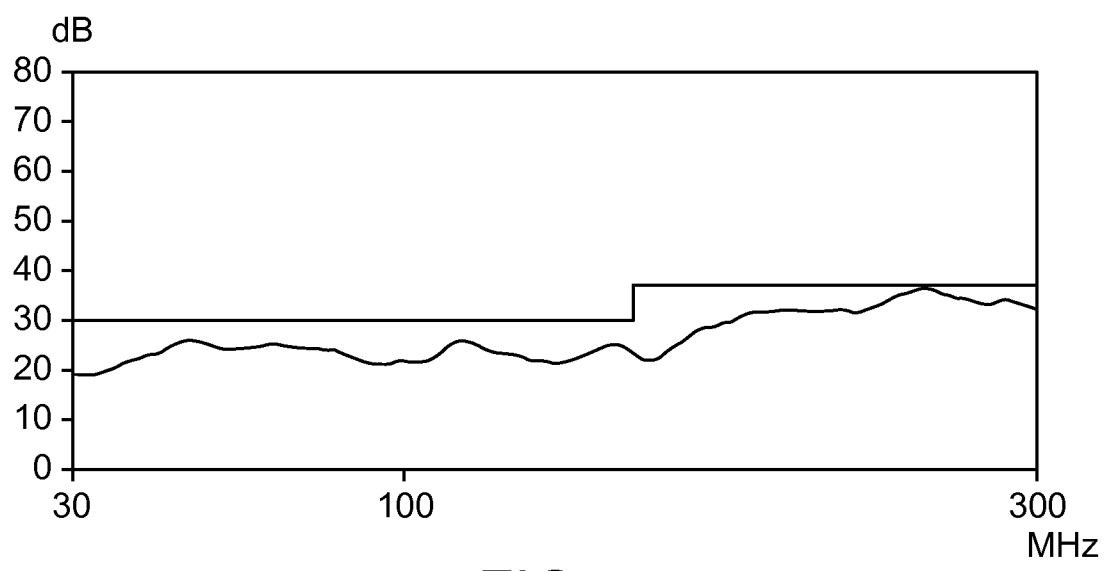
FIG. 7 is a plot illustrating the relationship between the magnetic flux and the frequency of the wireless power transmission device in the charging mode according to the embodiment of the present invention.

According to the third voltage, a third current I3 is generated. When the third current I3 flows through the first transmitter coil 43, an electromagnetic effect is generated. According to the electromagnetic effect, a fourth magnetic flux is generated by the first transmitter coil 43. The fourth magnetic flux is oriented in the direction toward the top surface of the main body 40. Under this circumstance, the second transmitter coil 44 and the third transmitter coil 45 are disabled. Consequently, the fourth magnetic flux is transmitted from the wireless power transmission device 4 to the receiver coil 51. The fourth magnetic flux is converted into an electric power E by the converting circuit 52. The electric power E is transmitted to the chargeable battery 53 in order to wireless charge the electronic device 5. During the charging process, the relationship between the magnetic flux and the frequency of the wireless power transmission device may be depicted by the plot of FIG. 7.

In case that the electronic device 5 is placed on the top surface of the main body 40 and the electronic device 5 is located near the second transmitter coil 44, the attenuated second magnetic flux F2 is received by the receiver coil 51 of the electronic device 5. Consequently, a second communication signal corresponding to the second transmitter coil 44 is transmitted from the receiver coil 51 to the second transmitter coil 44. After the second communication signal is received by the detecting module 46, the detecting module 46 issues a third switching signal S3 to the controlling unit 47. According to the third switching signal S3, the controlling unit 47 controls the driving circuit 42 to provide the third voltage to the second transmitter coil 44. Meanwhile, the second transmitter coil 44 is in the charging mode.

According to the third voltage, the third current I3 is generated. When the third current I3 flows through the second transmitter coil 44, an electromagnetic effect is generated. According to the electromagnetic effect, a fifth magnetic flux F5 is generated by the second transmitter coil 44. The fifth magnetic flux F5 is oriented in the direction toward the top surface of the main body 40. Under this circumstance, the first transmitter coil 43 and the third transmitter coil 45 are disabled. Consequently, the fifth magnetic flux F5 is transmitted from the wireless power transmission device 4 to the receiver coil 51. The received fifth magnetic flux F5 is converted into an electric power E by the converting circuit 52. The electric power E is transmitted to the chargeable battery 53 in order to wireless charge the electronic device 5.

In case that the electronic device 5 is placed on the top surface of the main body 40 and the electronic device 5 is located over the third transmitter coil 45, the attenuated third magnetic flux is received by the receiver coil 51 of the electronic device 5. Consequently, a third communication signal corresponding to the third transmitter coil 45 is transmitted from the receiver coil 51 to the third transmitter coil 45. After the third communication signal is received by the detecting module 46, the detecting module 46 issues a fourth switching signal (not shown) to the controlling unit 47. According to the fourth switching signal, the controlling unit 47 controls the driving circuit 42 to provide the third voltage to the third transmitter coil 45. Meanwhile, the third transmitter coil 45 is in the charging mode.

According to the third voltage, the third current I3 is generated. When the third current I3 flows through the third transmitter coil 45, an electromagnetic effect is generated. According to the electromagnetic effect, a sixth magnetic flux is generated by the third transmitter coil 45. The sixth magnetic flux is oriented in the direction toward the top surface of the main body 40. Under this circumstance, the first transmitter coil 43 and the second transmitter coil 44 are disabled. Consequently, the sixth magnetic flux is transmitted from the wireless power transmission device 4 to the receiver coil 51. After the sixth magnetic flux is received by the third transmitter coil 45, the received sixth magnetic flux is converted into an electric power E by the converting circuit 52. The electric power E is transmitted to the chargeable battery 53 in order to wireless charge the electronic device 5.

The following two aspects should be specially described. Firstly, in this embodiment, the wireless power transmission device 4 comprises the first transmitter coil 43, the second transmitter coil 44 and the third transmitter coil 45. It is noted that numerous modifications and alterations may be made while retaining the teachings of the invention. For example, the number of transmitter coils of the wireless power transmission device 4 may be varied according to the practical requirements. In another embodiment, the wireless power transmission device may comprise only the first transmitter coil and the second transmitter coil. Under this circumstance, the efficacy of generating the attenuated magnetic flux in the detecting mode can still be achieved by the wireless power transmission device with two transmitter coils.

Secondly, when the second transmitter coil 44 is in the detecting mode, the second reverse magnetic flux R2 is generated by the first transmitter coil 43 to inhibit the energy of the second magnetic flux F2. It is noted that numerous modifications and alterations may be made while retaining the teachings of the invention. For example, in another embodiment, when the second transmitter coil is in the detecting mode, the second reverse magnetic flux is generated by the third transmitter coil and the first transmitter coil is disabled. Alternatively, when the second transmitter coil is in the detecting mode, the first transmitter coil and the third transmitter coil are controlled to generate the electromagnetic effect, so that the second reverse magnetic flux is generated by the first transmitter coil and the third transmitter coil to inhibit the energy of the second magnetic flux.

From the above descriptions, the wireless power transmission device of the present invention at least comprises the first transmitter coil and the second transmitter coil. The second transmitter coil is partially stacked over the first transmitter coil. In case that the first transmitter coil is in the detecting mode, the first transmitter coil transmits a magnetic flux to the top surface of the main body, and the second transmitter coil generates an inverse magnetic flux. Since the direction of the inverse magnetic flux is opposite to the direction of the magnetic flux, the magnetic flux is attenuated and the energy of the electromagnetic wave is reduced. Consequently, the influence of the electromagnetic wave on the health of the human body will be minimized. In case that the second transmitter coil is in the detecting mode, the operations are similar to the first transmitter coil. In case that the wireless power transmission device is operated in the charging mode, the first transmitter coil or the second transmitter coil is controlled to transmit the magnetic flux. Since the magnetic flux is generated at the position near the electronic device, the power-saving purpose is achievable.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A wireless power transmission device for wirelessly charging an electronic device, the wireless power transmission device comprising:

a main body;

a driving circuit disposed within the main body, and providing a first voltage or a second voltage;

a first transmitter coil disposed within the main body and located near a first lateral side of the main body; and a second transmitter coil disposed within the main body, located away from the first lateral side of the main body, and partially stacked over the first transmitter coil, wherein if the electronic device is not placed on the main body and the first transmitter coil is in a detecting mode, the driving circuit periodically provides the first voltage to the first transmitter coil at a first predetermined time interval, wherein a first magnetic flux is generated by the first transmitter coil according to the first voltage and the first magnetic flux is attenuated by the second transmitter coil, so that the attenuated first magnetic flux is periodically outputted from the wireless power transmission device at the first predetermined time interval, wherein if the electronic device is not placed on the main body and the second transmitter coil is in a detecting mode, the driving circuit periodically provides the first voltage to the second transmitter coil at the first predetermined time interval, wherein a second magnetic flux is generated by the second transmitter coil according to the first voltage and the second magnetic flux is attenuated by the first transmitter coil, so that the attenuated second magnetic flux is periodically outputted from the wireless power transmission device at the first predetermined time interval, wherein if the electronic device is placed on the main body and located near the first transmitter coil, the driving circuit provides a third voltage to the first transmitter coil, so that the first transmitter coil is in a charging mode and the first transmitter coil generates a fourth magnetic flux to a receiver coil of the electronic device, wherein if the electronic device is placed on the main body and located near the second transmitter coil, the driving circuit provides the third voltage to the second transmitter coil, so that the second transmitter coil is in the charging mode and the second transmitter coil generates a fifth magnetic flux to the receiver coil, the wireless power transmission device further comprising:

a detecting module disposed within the main body, and detecting whether the electronic device is placed on the main body and whether the electronic device is located near the first transmitter coil or the second transmitter coil; and a controlling unit connected with the detecting module and the device circuit, wherein if the electronic device is placed on the main body and located near the first transmitter coil, a first communication signal from the receiver coil is received by the first transmitter coil, the first communication signal is transmitted to the detecting module, and a second switching signal is transmitted from the detecting module to the controlling unit, wherein the controlling unit controls the driving circuit to provide the third voltage according to the second switching signal, so that a third current is generated to the first transmitter coil and the first transmitter coil is in the charging mode, wherein if the electronic device is placed on the main body and located near the second transmitter coil, a second communication signal from the receiver coil is received by the second transmitter coil, the second communication signal is transmitted to the detecting module, and a third switching signal is transmitted from the detecting module to the controlling unit, wherein the controlling unit controls the driving circuit to provide the third voltage according to the second transmitter coil, so that the third current is generated to the second transmitter coil and the second transmitter coils is in the charging mode, wherein if the electronic device is not placed on the main body and the first communication signal or the second communication signal is not received by the detecting module, a first switching signal is transmitted from the detecting module to the controlling unit, wherein according to the first switching signal, the controlling unit controls the driving circuit to provide the first voltage within a first predetermined time segment such that the first current is generated to the first transmitter coil and the first transmitter coil is in the detecting mode, and the controlling unit controls the driving circuit to provide the first voltage within a second predetermined time segment such that the first current is generated to the second transmitter coil and the second transmitter coil is in the detecting mode.

2. The wireless power transmission device according to claim 1, wherein if the first transmitter coil is in the detecting mode, the driving circuit periodically provides the first voltage to the first transmitter coil at the first predetermined time interval such that the first transmitter coil generates the first magnetic flux, and the driving circuit periodically provides a second voltage to the second transmitter coil at the first predetermined time interval such that the second transmitter coil generates a first reverse magnetic flux, wherein the first magnetic flux is attenuated according to the first reverse magnetic flux, so that the attenuated first magnetic flux is periodically outputted from the wireless power transmission device at the first predetermined time interval.

3. The wireless power transmission device according to claim 2, wherein if the first transmitter coil is in the detecting mode, the first magnetic flux and the first reverse magnetic flux have opposite directions.

4. The wireless power transmission device according to claim 1, wherein if the second transmitter coil is in the detecting mode, the driving circuit periodically provides the first voltage to the second transmitter coil at the first predetermined time interval such that the second transmitter coil generates the second magnetic flux, and the driving circuit periodically provides a second voltage to the first transmitter coil at the first predetermined time interval such that the first transmitter coil generates a second reverse magnetic flux, wherein the second magnetic flux is attenuated according to the second reverse magnetic flux, so that the attenuated second magnetic flux is periodically outputted from the wireless power transmission device at the first predetermined time interval.

5. The wireless power transmission device according to claim 4, wherein if the second transmitter coil is in the detecting mode, the second magnetic flux and the second reverse magnetic flux have opposite directions.

6. The wireless power transmission device according to claim 1, further comprising a third transmitter coil, wherein the third transmitter coil is disposed within the main body and located near a second lateral side of the main body, and the second transmitter coil is partially stacked over the third transmitter coil, wherein if the electronic device is not placed on the main body and the third transmitter coil is in the detecting mode, the driving circuit periodically provides the first voltage to the third transmitter coil at the first predetermined time interval, so that a third magnetic flux is generated by the third transmitter coil and the third magnetic flux is attenuated by the second transmitter coil, wherein the attenuated magnetic flux is periodically outputted from the wireless power transmission device at the first predetermined time interval, wherein if the electronic device is placed on the main body and located near the third transmitter coil, the driving circuit provides the third voltage to the third transmitter coil, so that the third transmitter coil is in the charging mode and the third transmitter coil generates a sixth magnetic flux to the receiver coil.

7. The wireless power transmission device according to claim 6, wherein if the third transmitter coil is in the detecting mode, the driving circuit periodically provides the first voltage to the third transmitter coil at the first predetermined time interval such that the third transmitter coil generates the third magnetic flux, and the driving circuit periodically provides a second voltage to the second transmitter coil at the first predetermined time interval such that the second transmitter coil generates a third reverse magnetic flux, wherein the third magnetic flux is attenuated according to the third reverse magnetic flux, so that the attenuated third magnetic flux is periodically outputted from the wireless power transmission device at the first predetermined time interval.

8. The wireless power transmission device according to claim 7, wherein if the third transmitter coil is in the detecting mode, the third magnetic flux and the third reverse magnetic flux have opposite directions.

* * * * *